United States Patent
Ge et al.

(10) Patent No.: US 12,076,860 B2
(45) Date of Patent: Sep. 3, 2024

(54) CONTROL METHOD FOR ROBOT, COMPUTER-READABLE STORAGE MEDIUM AND ROBOT

(71) Applicant: UBTECH ROBOTICS CORP LTD, Shenzhen (CN)

(72) Inventors: Ligang Ge, Shenzhen (CN); Yizhang Liu, Shenzhen (CN); Chunyu Chen, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 368 days.

(21) Appl. No.: 17/561,609

(22) Filed: Dec. 23, 2021

(65) Prior Publication Data
US 2022/0203521 A1  Jun. 30, 2022

(30) Foreign Application Priority Data

Dec. 24, 2020 (CN) .......................... 202011547522.5

(51) Int. Cl.
*B62D 57/032* (2006.01)
*B25J 9/16* (2006.01)
*B62D 57/024* (2006.01)

(52) U.S. Cl.
CPC ........... *B25J 9/1602* (2013.01); *B25J 9/1633* (2013.01)

(58) Field of Classification Search
CPC . B25J 9/1602; B25J 9/1633; B25J 9/00; B25J 9/16; B25J 9/0006; B25J 9/1664;
(Continued)

(56) References Cited

U.S. PATENT DOCUMENTS 9,878,751 B1 * 1/2018 Thorne ................ B62D 57/032
2005/0085948 A1 * 4/2005 Herr ..................... B62D 57/032
700/258
(Continued)

FOREIGN PATENT DOCUMENTS

CN   110244791 A    9/2019
JP   2018058177 A * 4/2018

OTHER PUBLICATIONS

Hong, "Capture Point-Based Controller Using Real-Time Zero Moment Point Manipulation for Stable Bipedal Walking in Human Environment," Aug. 3, 2019 (Year: 2019).*

(Continued)

*Primary Examiner* — B M M Hannan
*Assistant Examiner* — Byron Xavier Kasper (57) ABSTRACT

A control method for a robot includes: determining a desired zero moment point (ZMP) of the robot; obtaining a position of a left foot and a position of a right foot of the robot, and calculating desired support forces of the left foot and the right foot according to the desired ZMP, the positions of the left foot and the right foot; obtaining measured support forces of the left foot and the right foot, and calculating an amount of change in length of the left leg and an amount of change in length of the right leg according to the desired support forces of the left foot and the right foot, the measured support forces of the left foot and the right foot; and controlling the robot to walk according to the amount of change in length of the left leg and the right leg.

20 Claims, 9 Drawing Sheets

(58) Field of Classification Search
CPC ............... B62D 57/032; B62D 57/024; G05D 2201/0217
See application file for complete search history.

(56) References Cited

U.S. PATENT DOCUMENTS

2011/0301756 A1* 12/2011 Yoshiike ............. B62D 57/032
901/1
2021/0009218 A1* 1/2021 Huang .................. B62D 57/02

OTHER PUBLICATIONS

Capture Point-Based Controller Using Real-Time Zero Moment Point Manipulation for Stable Bipedal Walking in Human Environment.

* cited by examiner

CONTROL METHOD FOR ROBOT, COMPUTER-READABLE STORAGE MEDIUM AND ROBOT

CROSS REFERENCE TO RELATED APPLICATIONS

This application claims priority to Chinese Patent Application No. 202011547522.5, filed Dec. 24, 2020, which is hereby incorporated by reference herein as if set forth in its entirety.

BACKGROUND

1. Technical Field

The present disclosure generally relates to robots, and particularly to a control method for a robot, a computer-readable storage medium, and a robot.

2. Description of Related Art

The walking stability of biped robots has always been a challenging research topic. Various robot control methods have been proposed to achieve stable walking of biped robots on an even surface (i.e., ground, floor, etc.). However, in the case of an uneven terrain, some biped robots may have difficulty to walk stably, and may even fall over.

Therefore, there is a need to provide a robot control method to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The present disclosure provides a legged robot. For simplicity of description, unless otherwise specified, the robots mentioned in the embodiments of the present disclosure are biped robots.

The walking of a biped robot can be described as a cyclic pattern of body movements which advances the robot's position. Assuming that all walking cycles are about the same, studying the walking process can be simplified by investigating one walking cycle. In general, each of these walking cycles is composed of two phases: a single-support phase (SSP) and a double-support phase (DSP). During the single-support phase, one leg is on the ground and the other leg is experiencing a swinging motion. The double-support phase starts once the swinging leg meets the ground and ends when the support leg leaves the ground.

The embodiments of the present disclosure mainly focus on the stability of the robot on the coronal plane. Unless otherwise specified, the physical quantities such as position, speed, and acceleration mentioned in the embodiments of the present disclosure are all components on a y-axis. The positive direction of the y-axis points away from the left side of the robot. That is, the positive direction of the y-axis is the direction that the robot faces after the robot has made a 90-degree turn to the left of the robot.

Figure 1:
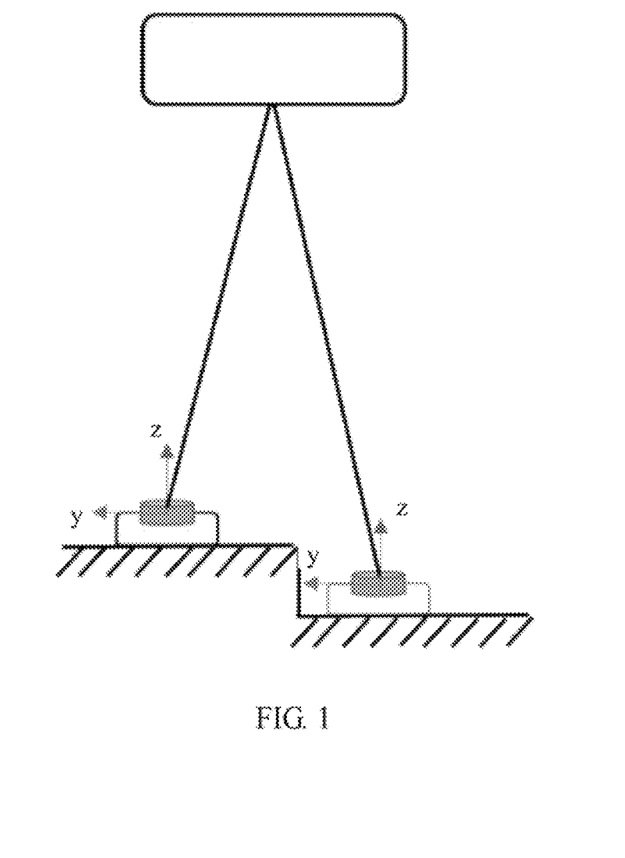
FIG. 1 is a schematic diagram of a biped robot according to one embodiment.

FIG. 1 shows a schematic diagram of the robot walking on an uneven terrain. The embodiments of the present disclosure use leg length control as an effective means to allow the robot to walk stably on the uneven terrain. By differentiating the leg lengths of the left and right legs during the double-support phase, the robot can adapt to changes in height to ensure a stable upright pose during walking. The embodiments of the present disclosure propose a control method based on a capture point (CP). Starting from the desired support forces of the left and right feet, a leg length controller is designed to adjust the leg length in real time during the double-support phase. The leg length is restored during the single-support phase, which realizes the stable control of the pose of the biped robot when walking on uneven terrain.

Figure 2:
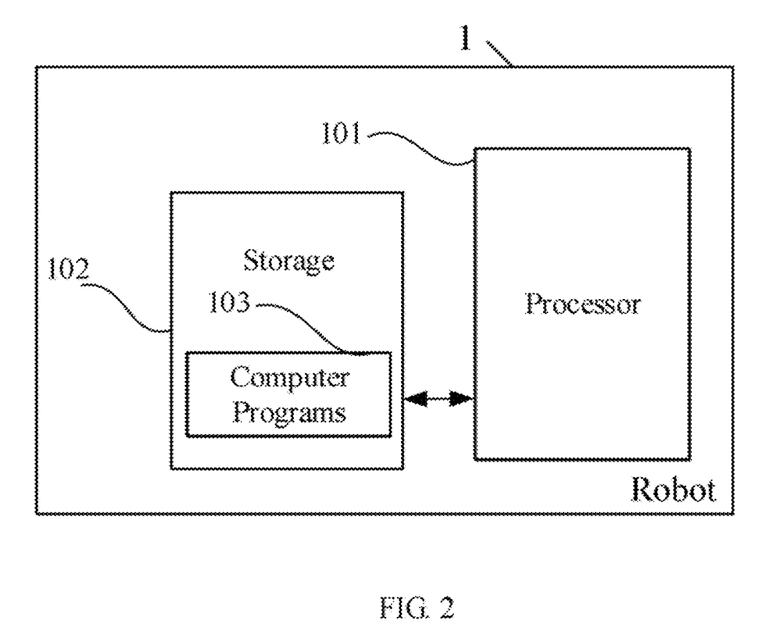
FIG. 2 is a schematic block diagram of the biped robot according to one embodiment.
Figure 3:
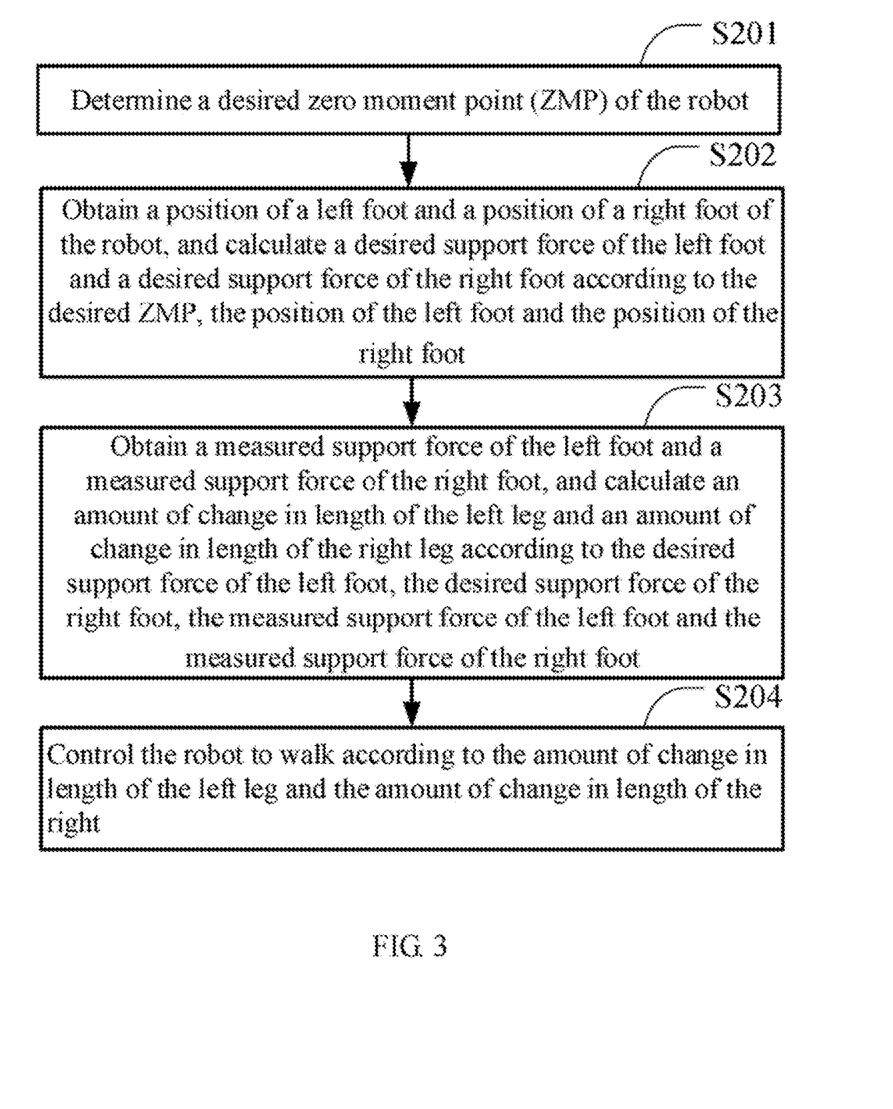
FIG. 3 is a schematic flowchart of a robot control method according to one embodiment.

FIG. 2 shows a schematic block diagram of the biped robot 1 according to one embodiment. The robot 1 may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the robot 1, such as steps S201 through S204 in FIG. 3 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot 1, such as a hard disk or a memory. The storage 102 may also be an external storage device of the robot 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 9:
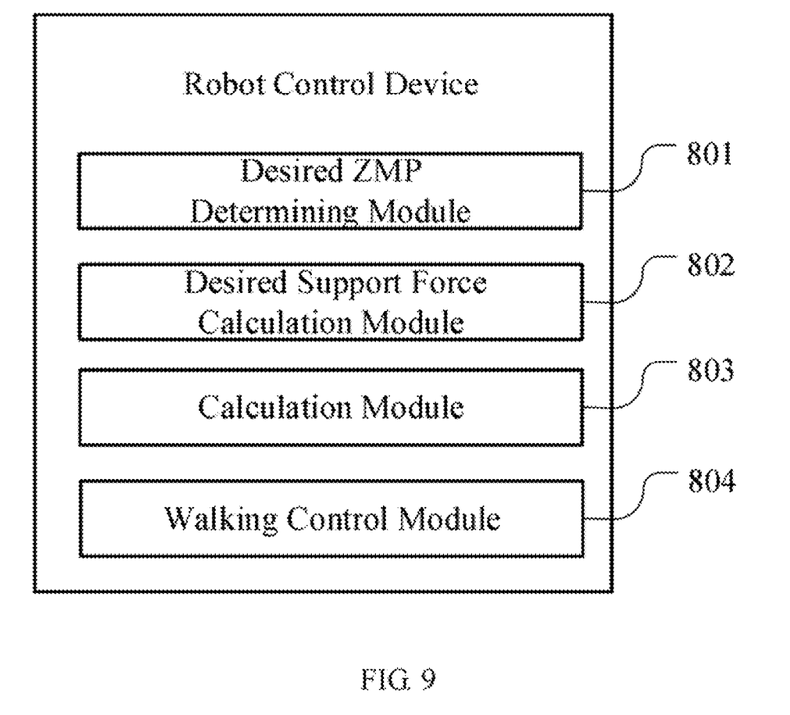
FIG. 9 is schematic block diagram of a robot control device according to embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 1. For example, the one or more computer programs 112 may be divided into a desired ZMP determining module 801, a desired support force calculation module 802, a calculation module 803, and a walking control module 804 as shown in FIG. 9.

FIG. 3 shows an exemplary flowchart of robot control method according to one embodiment. The method can be implemented to control the robot 1 shown in FIG. 1. In one embodiment, the method may include steps 201 to S204.

Step S201. Determine a desired zero moment point (ZMP) of the robot.

Figure 4:
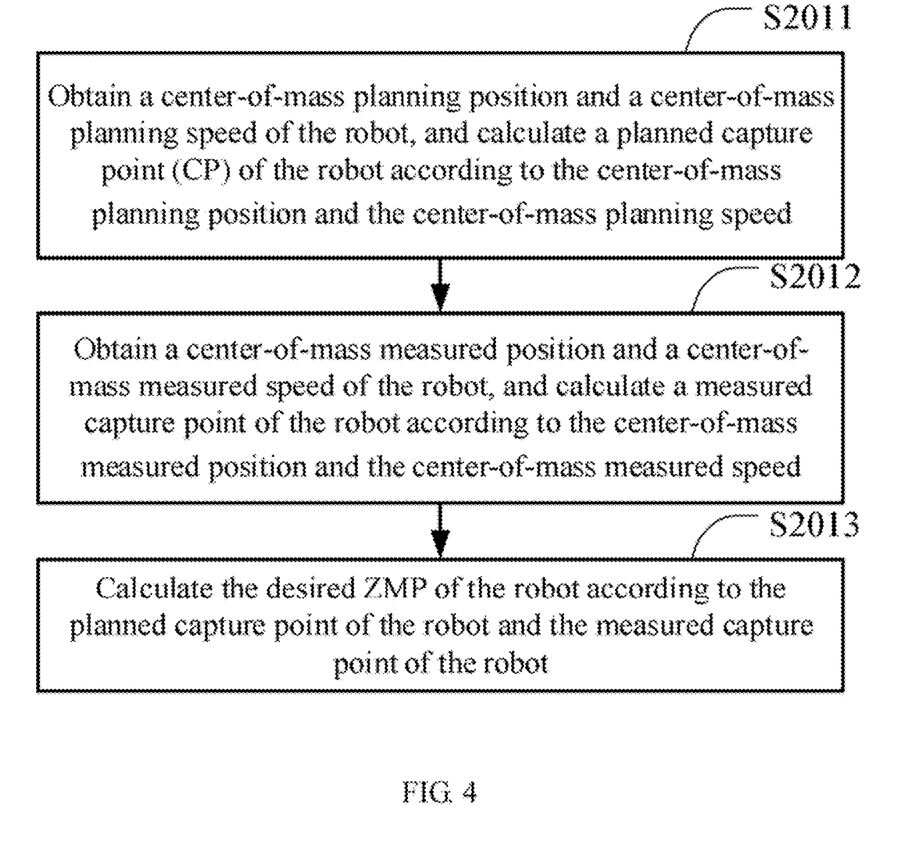
FIG. 4 is a schematic flowchart of calculating a desired ZMP according to one embodiment.

Referring to FIG. 4, in one embodiment, step S201 may include the following steps.

Step S2011: Obtain a center-of-mass planning position and a center-of-mass planning speed of the robot, and calculate a planned capture point (CP) of the robot according to the center-of-mass planning position and the center-of-mass planning speed.

Generally, in robot planning and control, model simplification is usually used to map complex multi-rigid body systems. The most classic simplified model is the Linear Inverted Pendulum Model (LIPM) shown in FIG. 5. Taking the coronal plane as an example, the dynamic equation of the LIPM is expressed as follows: $\ddot{y}_c = \omega^2(y_c - p_y)$, where $\ddot{y}_c$ represents acceleration of the center of mass of the robot, $y_c$ represents the position of the center of mass of the robot, $p_y$ represents the ZMP of the robot, $\omega$ represents the natural frequency of the LIPM and is equal to $\sqrt{g/Z_c}$, g represents acceleration due to gravity, $Z_c$ represents the height of the center of mass of the robot.

Figure 5:
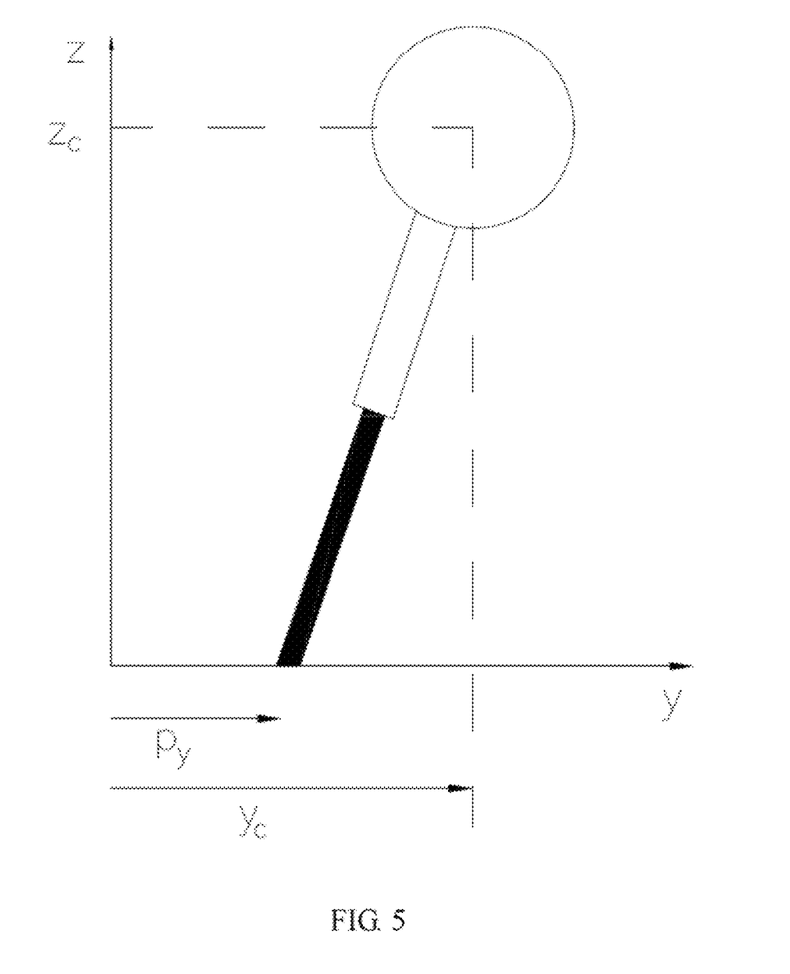
FIG. 5 is a schematic diagram of a linear inverted pendulum model (LIPM) according to one embodiment.

The CP is an important concept in LIPM, and its physical meaning is a support point where the inverted pendulum is completely stationary. In other words, if the robot steps on the CP during walking, the center of mass of the robot can be completely stationary.

The CP is denoted by $\xi_y$, and can be calculated according to the following equation:

$$\xi_y = y_c + \frac{\dot{y}_c}{\omega},$$

where $\dot{y}_c$ represents speed of the center of mass of the robot.

In the embodiment, the position and speed of the center of mass of the robot can be planned in advance using any proper conventional planning method according to actual needs. Here, the position and speed of the center-of-mass of the robot obtained by the planning are referred to as the center-of-mass planning position and the center-of-mass planning speed, respectively. After the center-of-mass planning position and center-of-mass planning speed are obtained in the planning, the CP (i.e., planned CP) can be calculated according to the following equation:

$$\xi_{plan} = y_{plan} + \frac{\dot{y}_{plan}}{\omega},$$

where $y_{plan}$ represents the center-of-mass planning position, $\dot{y}_{plan}$ represents the center-of-mass planning speed, $\xi_{plan}$ represents the planned CP.

Step S2012: Obtain a center-of-mass measured position and a center-of-mass measured speed of the robot, and calculate a measured capture point of the robot according to the center-of-mass measured position and the center-of-mass measured speed.

In one embodiment, the position and speed of the center of mass of the robot can be determined based on the data measured by a six-dimensional force sensor and inertial measurement unit (IMU) pre-installed on the robot using any proper conventional evaluation method according to actual needs. The estimated center-of-mass position and center-of-mass speed are referred to as center-of-mass measured position and center-of-mass measured speed, respectively. After the center-of-mass measured position and center-of-mass measured speed are obtained, the CP (i.e., measured CP) can be calculated according to the following equation:

$$\xi_{measure} = y_{measure} + \frac{\dot{y}_{measure}}{\omega},$$

where $\xi_{measure}$ represents the measured CP.

Step S2013: Calculate the desired ZMP of the robot according to the planned capture point of the robot and the measured capture point of the robot.

By differentiating the definition of CP and substituting the LIPM kinetic equation, the following equation can be obtained: $\dot{\xi}_y = \omega(\xi_y - p_y)$. The following equation can be obtained by solving the first-order differential equation above: $\xi_y(t) = e^{\omega t}\xi_y(0) + (1 - e^{\omega t})p_y$, where $\xi_y(0)$ represents the initial position of the CP. Assume that $\xi_y(t)$ is equal to $\xi_{plan}$ and $\xi_y(0)$ is equal to $\xi_{measure}$, substitute them into the equation above, and perform shift transformation, the desired ZMP based on the CP controller can be obtained:

$$p_y = \frac{1}{1 - e^{\omega dT}}\xi_{plan} + \left(1 - \frac{1}{1 - e^{\omega dT}}\right)\xi_{measure}. \text{ Let } K_{cp_{control}} = \frac{1}{1 - e^{\omega dt}},$$

and dT represents the time required for $\xi_{measure}$ to track $\xi_{plan}$ and can be adjusted according to actual needs. Then, the equation above can be expressed as follows: $p_y = K_{cp_{control}}\xi_{plan} + (1 - K_{cp_{control}})\xi_{measure}$. By adjusting the controller parameter $K_{cp_{control}}$, the effect of $\xi_{measure}$ tracking $\xi_{plan}$ can be changed.

Step S202: Obtain a position of a left foot and a position of a right foot of the robot, and calculate a desired support force of the left foot and a desired support force of the right foot according to the desired ZMP, the position of the left foot and the position of the right foot.

In one embodiment, the support force distribution coefficient can be calculated according to the following equation:

$$K_f = \frac{|p_y - p_{lf}|}{|p_{lf} - p_{rf}|},$$

where $p_y$ represents the desired ZMP, $p_{lf}$ represents the position of the left foot, $p_{rf}$ represents the position of the right foot, and $K_f$ represents the support force distribution coefficient. It should be noted that since the desired ZMP may be located outside of the positions of the left and right feet, $K_f$ can be limited during actual use to ensure $0 \leq K_f \leq 1$.

Then, the desired support force of the left foot and the desired support force of the right foot can be calculated according to the supporting force distribution coefficient and the mass of the robot using the following equations: $f_{rd}=K_f Mg$, and $f_{ld}=(1-K_f)Mg$, where M represents the mass of the robot, g represents acceleration due to gravity, $f_{ld}$ represents the desired support force of the left foot, and $f_{rd}$ represents the desired support force of the right foot. According to the equations above, the desired support force of the left or right foot is proportional to the distance between the ZMP and the eft or right foot. That is, the closer one of the two feet to the ZMP is, the greater the desired support force of the one of the two feet is.

Step S203: Obtain a measured support force of the left foot and a measured support force of the right foot, and calculate an amount of change in length of the left leg and an amount of change in length of the right leg according to the desired support force of the left foot, the desired support force of the right foot, the measured support force of the left foot and the measured support force of the right foot.

In one embodiment, the actual support force of the left foot and support force of the right foot of the robot can be measured by a six-dimensional force sensor. They are respectively referred to as the measured support force of the left foot and the measured support force of the right foot.

Figure 6:
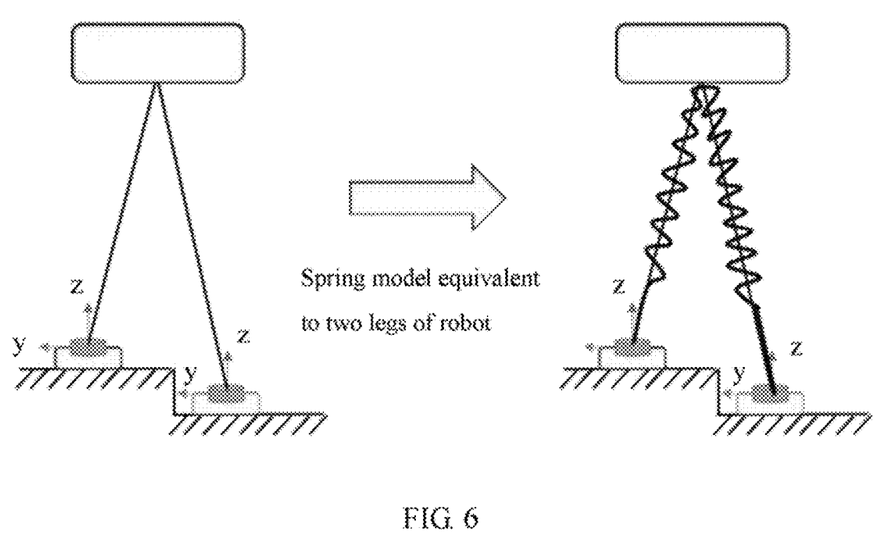
FIG. 6 shows a schematic spring model equivalent to two legs of the biped robot according to one embodiment.

Referring to FIG. 6, in one embodiment, the legs of the robot can be equivalent to a spring model, and the leg length can be adjusted based on this spring model.

First, a first difference between the measured support force of the left foot and the measured support force of the right foot is calculated. That is, $\Delta F=f_{lm}-f_{rm}$, where $f_{lm}$ represents the measured support force of the left foot, $f_{rm}$ represents the measured support force of the right foot, and $\Delta F$ represents the first difference.

Second, a second difference between the desired support force of the left foot and the desired support force of the right foot is calculated. That is, $\Delta F_d=f_{ld}-f_{rd}$, where $\Delta F_d$ represents the second difference.

Third, a third difference between the first difference and the second difference is calculated, and a total amount of change in leg length of the robot is calculated according to the third difference. That is, a leg length controller can be designed according to the following equation: $\dot{u}_z=K_p(\Delta F-\Delta F_d)-K_s u_z$, where $\Delta F-\Delta F_d$ represents the third difference, $K_p$ represents a preset damping coefficient, $K_s$ represents a preset stiffness parameter, $u_z$ represents the total amount of change in leg length of the robot, and $\dot{u}_z$ represents speed of change in leg length of the robot. It should be noted the values of the parameters $K_p$ and $K_s$ can be set according to actual needs. The value of $u_z$ can be obtained by solving the equation above.

Figure 7:
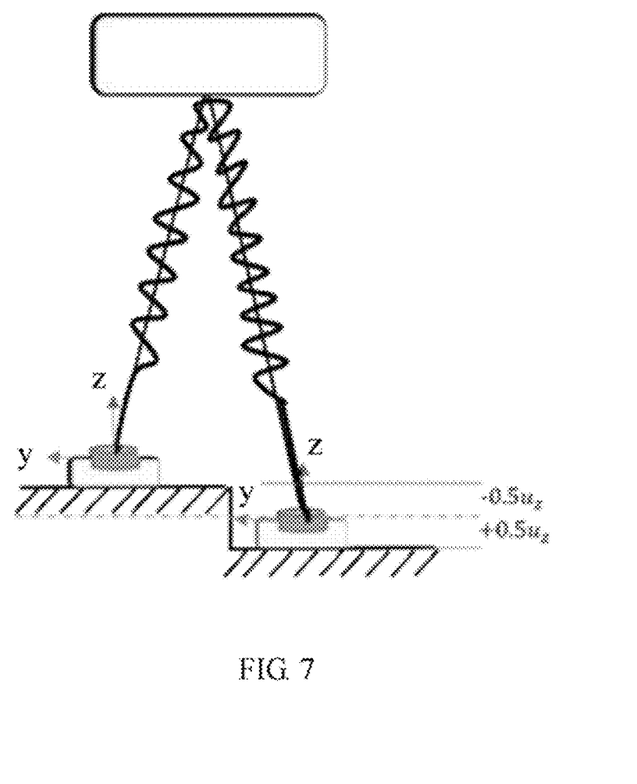
FIG. 7 is a schematic diagram showing adjustment of leg length according to one embodiment.

Finally, the amount of change in length of the left leg and the amount of change in length of the right leg can be calculated according to the total amount of change in leg length of the robot. As shown in FIG. 7, the amount of change in length of the left leg can be set to $0.5 u_z$, and the amount of change in length of the right leg can be set to $-0.5 u_z$, where the positive sign indicates that the leg length is increased, and the negative sign indicates that the leg length is decreased. Alternatively, the amount of change in length of the left leg can be set to $-0.5 u_z$, and the amount of change in length of the right leg can be set to $0.5 u_z$. It should be noted that the values of the amount of change in length of the left leg and amount of change in length of the right leg can change according to actual needs.

Step S204: Control the robot to walk according to the amount of change in length of the left leg and the amount of change in length of the right leg.

Figure 8:
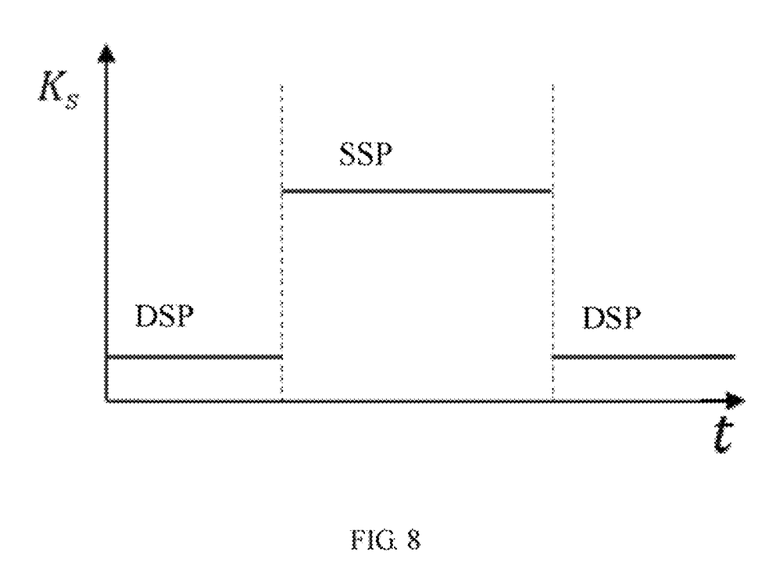
FIG. 8 is a schematic diagram showing the change of spring stiffness in different walking phases.

FIG. 8 shows a schematic diagram showing change of the spring stiffness in different walking phases. By adjusting the spring stiffness, the original desired leg length can be restored. In the case of high stiffness, the spring has a small amount of deformation and can be used for the restoring of leg length during single-support phase. When the stiffness is low, the spring has a large amount of deformation and can be used to track the desired force during the double-support phase to ensure real-time adaptation to the terrain height.

According to the embodiments above, the support force is distributed between the two feet of the robot according to the desired zero moment point of the robot, and the length of the legs of the robot can be adjusted based on the support force of the two feet, so that the leg length is always adapted to the support surface (ground, floor, etc.), which allows the robot to walk stably even when the support surface is uneven.

It should be noted that, the sequence numbers of the foregoing procedures do not imply an execution sequence, and the execution sequence of the procedures should be determined according to their functions and internal logic, which is not intended to limit an implementation procedure of the embodiments of the present disclosure.

Referring to FIG. 9, in one embodiment, a robot control device may include a desired ZMP determining module 801, a desired support force calculation module 802, a calculation module 803, and a walking control module 804. The desired ZMP determining module 801 is to determine a desired zero moment point (ZMP) of the robot. The desired support force calculation module 802 is to obtain a position of a left foot and a position of a right foot of the robot, and calculate a desired support force of the left foot and a desired support force of the right foot according to the desired ZMP, the position of the left foot and the position of the right foot The calculation module 803 is to obtain a measured support force of the left foot and a measured support force of the right foot, and calculate an amount of change in length of the left leg and an amount of change in length of the right leg according to the desired support force of the left foot, the desired support force of the right foot, the measured support force of the left foot and the measured support force of the right foot. The walking control module 804 is to control the robot to walk according to the amount of change in length of the left leg and the amount of change in length of the right leg.

In one embodiment, the calculation module 803 may include a first difference calculation unit, a second difference calculation unit, a third difference calculation unit, a total calculation unit, and a leg length calculation unit. The first difference calculation unit is to calculate a first difference between the measured support force of the left foot and the measured support force of the right foot. The second difference calculation unit is to calculate a second difference between the desired support force of the left foot and the desired support force of the right foot. The third difference calculation unit is configured to calculate a third difference between the first difference and the second difference. The total calculation unit is to calculate a total amount of change in leg length of the robot according to the third difference. The leg length calculation unit is to calculate the amount of change in length of the left leg and the amount of change in length of the right leg according to the total amount of change in leg length of the robot.

In one embodiment, the desired support force calculation module 802 may include a coefficient calculation unit and a desired support force calculating unit. The coefficient calculation unit is to calculate a support force distribution coefficient according to the desired ZMP, the position of the left foot and the position of the right foot. The desired support force calculating unit is to calculate the desired support force of the left foot and the desired support force of the right foot according to the supporting force distribution coefficient and the mass of the robot.

In one embodiment, the coefficient calculation unit may calculate the support force distribution coefficient according to the following equation:

$$K_f = \frac{|p_y - p_{lf}|}{|p_{lf} - p_{rf}|},$$

where $p_y$ represents the desired ZMP, $p_{lf}$ represents the position of the left foot, $p_{rf}$ represents the position of the right foot, and $K_f$ represents the support force distribution coefficient.

In one embodiment, the desired support force calculating unit may calculate the desired support force of the left foot and the desired support force of the right foot according to the following equation: $f_{rd}=K_f Mg$, and $f_{ld}=(1-K_f)Mg$, where M represents the mass of the robot, g represents acceleration due to gravity, $f_{ld}$ represents the desired support force of the left foot, and $f_{rd}$ represents the desired support force of the right foot.

In one embodiment, the desired ZMP determining module 801 may include a planning CP calculation unit, a measured CP calculation unit, and a desired ZMP calculation unit. The planning CP calculation unit is to obtain a center-of-mass planning position and a center-of-mass planning speed of the robot, and calculate a planned capture point of the robot according to the center-of-mass planning position and the center-of-mass planning speed. The measured CP calculation unit is to obtain a center-of-mass measured position and a center-of-mass measured speed of the robot, and calculate a measured capture point of the robot according to the center-of-mass measured position and the center-of-mass measured speed. The desired ZMP calculation unit is to calculate the desired ZMP of the robot according to the planned capture point of the robot and the measured capture point of the robot.

In one embodiment, the desired ZMP calculation unit may calculate the desired ZMP according to the following equation: $p_y = K_{cp_{control}} \xi_{plan} + (1 - K_{cp_{control}}) \xi_{measure}$, where $\xi_{plan}$ represents the planned capture point, $\xi_{measure}$ represents the measured capture point, $K_{cp_{control}}$ represents a preset controller parameter, and $p_y$ represents the desired ZMP of the robot.

A person having ordinary skill in the art may clearly understand that, for the convenience and conciseness of description, the specific working processes of the above-described devices, modules and units can refer to the corresponding processes in the foregoing method embodiments, and will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features, however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented control method for a robot, comprising:
   determining a desired zero moment point (ZMP) of the robot;
   obtaining a position of a left foot and a position of a right foot of the robot, and calculating a desired support force of the left foot and a desired support force of the right foot according to the desired ZMP, the position of the left foot and the position of the right foot;
   obtaining a measured support force of the left foot and a measured support force of the right foot, and calculating an amount of change in length of the left leg and an amount of change in length of the right leg according to the desired support force of the left foot, the desired support force of the right foot, the measured support force of the left foot, and the measured support force of the right foot, wherein the left leg and the right leg are equivalent to a spring model, the length of the left leg and the length of the right leg are adjusted based on the spring model, the change in the length of the left leg comprises elongation and shortening in the length of the left leg equivalent to the spring model, and the change in the length of the right leg comprises elongation and shortening in the length of the right leg equivalent to the spring model; and
   controlling the robot to walk according to the amount of change in length of the left leg and the amount of change in length of the right leg;
   wherein calculating the desired support force of the left foot and the desired support force of the right foot comprises:
   calculating a support force distribution coefficient according to the desired ZMP, the position of the left foot, and the position of the right foot; and
   calculating the desired support force of the left foot and the desired support force of the right foot according to the supporting force distribution coefficient and a mass of the robot;
   wherein the support force distribution coefficient is calculated according to the following equation:

$$K_f = \frac{|p_y - p_{lf}|}{|p_{lf} - p_{rf}|},$$

where $p_y$ represents the desired ZMP, $p_{lf}$ represents the position of the left foot, $p_{rf}$ represents the position of the right foot, and $K_f$ represents the support force distribution coefficient.

2. The method of claim 1, wherein calculating the amount of change in length of the left leg and the amount of change in length of the right leg comprises:
   calculating a first difference between the measured support force of the left foot and the measured support force of the right foot;
   calculating a second difference between the desired support force of the left foot and the desired support force of the right foot;
   calculating a third difference between the first difference and the second difference;
   calculating a total amount of change in leg length of the robot according to the third difference; and
   calculating the amount of change in length of the left leg and the amount of change in length of the right leg according to the total amount of change in leg length of the robot.

3. The method of claim 1, wherein the desired support force of the left foot and the desired support force of the right foot are calculated according to the following equations: $f_{rd}=K_f Mg$, and $f_{ld}=(1-K_f)Mg$, where $K_f$ represents the support force distribution coefficient, M represents the mass of the robot, g represents acceleration due to gravity, $f_{ld}$ represents the desired support force of the left foot, and $f_{rd}$ represents the support force of the right foot.

4. The method of claim 1, wherein determining the desired ZMP of the robot comprises:
   obtaining a center-of-mass planning position and a center-of-mass planning speed of the robot, and calculating a planned capture point of the robot according to the center-of-mass planning position and the center-of-mass planning speed;
   obtaining a center-of-mass measured position and a center-of-mass measured speed of the robot, and calculating a measured capture point of the robot according to the center-of-mass measured position and the center-of-mass measured speed; and calculating the desired ZMP of the robot according to the planned capture point of the robot and the measured capture point of the robot.

5. The method of claim 4, wherein the desired ZMP of the robot is calculated according to the following equation:

$p_y = K_{cp_{control}} \xi_{plan} + (1 - K_{cp_{control}}) \xi_{measure}$, where $\xi_{plan}$ represents the planned capture point, $\xi_{measure}$ represents the measured capture point, $K_{cp_{control}}$ represents a preset controller parameter, and $p_y$ represents the desired ZMP of the robot;

wherein $$K_{cp_{control}} = \frac{1}{1 - e^{\omega dT}},$$

where $\omega$ represents a natural frequency of a linear inverted pendulum model, dT represents a time required for $\xi_{measure}$ to track $\xi_{plan}$, and e is a natural constant.

6. A robot comprising:
one or more processors;
a memory; and
one or more programs, wherein the one or more programs are stored in the memory and configured to be executed by the one or more processors, the one or more programs comprises:
instructions for determining a desired zero moment point (ZMP) of the robot;
instructions for obtaining a position of a left foot and a position of a right foot of the robot, and calculating a desired support force of the left foot and a desired support force of the right foot according to the desired ZMP, the position of the left foot and the position of the right foot;
instructions for obtaining a measured support force of the left foot and a measured support force of the right foot, and calculating an amount of change in length of the left leg and an amount of change in length of the right leg according to the desired support force of the left foot, the desired support force of the right foot, the measured support force of the left foot and the measured support force of the right foot, wherein the left leg and the right leg are equivalent to a spring model, the length of the left leg and the length of the right leg are adjusted based on the spring model, the change in the length of the left leg comprises elongation and shortening in the length of the left leg equivalent to the spring model, and the change in the length of the right leg comprises elongation and shortening in the length of the right leg equivalent to the spring model; and
instructions for controlling the robot to walk according to the amount of change in length of the left leg and the amount of change in length of the right leg;
wherein the instructions for calculating the desired support force of the left foot and the desired support force of the right foot comprise:
instructions for calculating a support force distribution coefficient according to the desired ZMP, the position of the left foot, and the position of the right foot; and
instructions for calculating the desired support force of the left foot and the desired support force of the right foot according to the supporting force distribution coefficient and a mass of the robot;

wherein the desired support force of the left foot and the desired support force of the right foot are calculated according to the following equations:

$f_{rd} = K_f M g$, and $f_{ld} = (1 - K_f) M g$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

7. The robot of claim 6, wherein the instructions for calculating the amount of change in length of the left leg and the amount of change in length of the right leg comprise:
instructions for calculating a first difference between the measured support force of the left foot and the measured support force of the right foot;
instructions for calculating a second difference between the desired support force of the left foot and the desired support force of the right foot;
instructions for calculating a third difference between the first difference and the second difference;
instructions for calculating a total amount of change in leg length of the robot according to the third difference; and
instructions for calculating the amount of change in length of the left leg and the amount of change in length of the right leg according to the total amount of change in leg length of the robot.

8. The robot of claim 6, wherein the support force distribution coefficient is calculated according to the following equation:

$$K_f = \frac{|p_y - p_{lf}|}{|p_{lf} - p_{rf}|},$$

where $p_y$ represents the desired ZMP, $p_{lf}$ represents the position of the left foot, $p_{rf}$ represents the position of the right foot, and $K_f$ represents the support force distribution coefficient.

9. The robot of claim 6, wherein the instructions for determining the desired ZMP of the robot comprise:
instructions for obtaining a center-of-mass planning position and a center-of-mass planning speed of the robot, and calculating a planned capture point of the robot according to the center-of-mass planning position and the center-of-mass planning speed;
instructions for obtaining a center-of-mass measured position and a center-of-mass measured speed of the robot, and calculating a measured capture point of the robot according to the center-of-mass measured position and the center-of-mass measured speed; and
instructions for calculating the desired ZMP of the robot according to the planned capture point of the robot and the measured capture point of the robot.

10. The robot of claim 9, wherein the desired ZMP of the robot is calculated according to the following equation:

$p_y = K_{cp_{control}} \xi_{plan} + (1 - K_{cp_{control}}) \xi_{measure}$, where $\xi_{plan}$ represents the planned capture point, $\xi_{measure}$ represents the measured capture point, $K_{cp_{control}}$ represents a preset controller parameter, and $p_y$ represents the desired ZMP of the robot;

wherein $$K_{cp_{control}} = \frac{1}{1 - e^{\omega dT}},$$

where ω represents a natural frequency of a linear inverted pendulum model, dT represents a time required for $\xi_{measure}$ to track $\xi_{plan}$, and e is a natural constant.

11. A non-transitory computer-readable storage medium storing one or more programs to be executed in a robot, the one or more programs, when being executed by one or more processors of the legged robot, causing the robot to perform processing comprising:
   determining a desired zero moment point (ZMP) of the robot;
   obtaining a position of a left foot and a position of a right foot of the robot, and calculating a desired support force of the left foot and a desired support force of the right foot according to the desired ZMP, the position of the left foot and the position of the right foot;
   obtaining a measured support force of the left foot and a measured support force of the right foot, and calculating an amount of change in length of the left leg and an amount of change in length of the right leg according to the desired support force of the left foot, the desired support force of the right foot, the measured support force of the left foot and the measured support force of the right foot, wherein the left leg and the right leg are equivalent to a spring model, the length of the left leg and the length of the right leg are adjusted based on the spring model, the change in the length of the left leg comprises elongation and shortening in the length of the left leg equivalent to the spring model, and the change in the length of the right leg comprises elongation and shortening in the length of the right leg equivalent to the spring model; and
   controlling the robot to walk according to the amount of change in length of the left leg and the amount of change in length of the right leg.

12. The non-transitory computer-readable storage medium of claim 11, wherein calculating the amount of change in length of the left leg and the amount of change in length of the right leg comprises:
   calculating a first difference between the measured support force of the left foot and the measured support force of the right foot;
   calculating a second difference between the desired support force of the left foot and the desired support force of the right foot;
   calculating a third difference between the first difference and the second difference;
   calculating a total amount of change in leg length of the robot according to the third difference; and
   calculating the amount of change in length of the left leg and the amount of change in length of the right leg according to the total amount of change in leg length of the robot.

13. The non-transitory computer-readable storage medium of claim 12, wherein the total amount of change in leg length of the robot is calculated according to the following equation:

$$\dot{u}_z = K_p(\Delta F - \Delta F_d) - K_s u_z,$$

where, ΔF represents the first difference, $\Delta F_d$ represents the second difference, $\Delta F - \Delta F_d$ represents the third difference, Kp represents a preset damping coefficient, Ks represents a preset stiffness parameter, $u_z$ represents the total amount of change in leg length of the robot, and $\dot{u}_z$ represents speed of change in leg length of the robot.

14. The non-transitory computer-readable storage medium of claim 11, wherein calculating the desired support force of the left foot and the desired support force of the right foot comprises:
   calculating a support force distribution coefficient according to the desired ZMP, the position of the left foot, and the position of the right foot; and
   calculating the desired support force of the left foot and the desired support force of the right foot according to the supporting force distribution coefficient and a mass of the robot.

15. The non-transitory computer-readable storage medium of claim 14, wherein the support force distribution coefficient is calculated according to the following equation:

$$K_f = \frac{|p_y - p_{lf}|}{|p_{lf} - p_{rf}|},$$

where $p_y$ represents the desired ZMP, $p_{lf}$ represents the position of the left foot, $p_{rf}$ represents the position of the right foot, and $K_f$ represents the support force distribution coefficient.

16. The non-transitory computer-readable storage medium of claim 14, wherein the desired support force of the left foot and the desired support force of the right foot are calculated according to the following equations: $f_{rd}=K_f Mg$, and $f_{ld}=(1-K_f)Mg$, where $K_f$ represents the support force distribution coefficient, M represents the mass of the robot, g represents acceleration due to gravity, $f_{ld}$ represents the desired support force of the left foot, and $f_{rd}$ represents the desired support force of the right foot.

17. The non-transitory computer-readable storage medium of claim 11, wherein determining the desired ZMP of the robot comprises:
   obtaining a center-of-mass planning position and a center-of-mass planning speed of the robot, and calculating a planned capture point of the robot according to the center-of-mass planning position and the center-of-mass planning speed;
   obtaining a center-of-mass measured position and a center-of-mass measured speed of the robot, and calculating a measured capture point of the robot according to the center-of-mass measured position and the center-of-mass measured speed; and
   calculating the desired ZMP of the robot according to the planned capture point of the robot and the measured capture point of the robot.

18. The non-transitory computer-readable storage medium of claim 17, wherein the desired ZMP of the robot is calculated according to the following equation:
   $p_y = K_{cp_{control}} \xi_{plan} + (1 - K_{cp_{control}}) \xi_{measure}$, where $\xi_{plan}$ represents the planned capture point, $\xi_{measure}$ represents the measured capture point, $K_{cp_{control}}$ represents a preset controller parameter, and $p_y$ represents the desired ZMP of the robot;
   wherein $$K_{cp_{control}} = \frac{1}{1 - e^{\omega dT}},$$

where, ω represents a natural frequency of a linear inverted pendulum model, dT represents a time required for $\xi_{measure}$ to track $\xi_{plan}$, and e is a natural constant.

19. The non-transitory computer-readable storage medium of claim 11, wherein the length of the left leg and the length of the right leg are adjusted by adjusting spring stiffness.

20. The non-transitory computer-readable storage medium of claim 11, the measured support force of the left foot and the measured support force of the right foot are measured by a six-dimensional force sensor.

\* \* \* \* \*